(12) United States Patent
LeGendre et al.

(10) Patent No.: US 8,775,766 B2
(45) Date of Patent: Jul. 8, 2014

(54) EXTENT SIZE OPTIMIZATION

(75) Inventors: David Bruce LeGendre, Tucson, AZ (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 12/698,663

(22) Filed: Feb. 2, 2010

(65) Prior Publication Data
US 2011/0191565 A1 Aug. 4, 2011

(51) Int. Cl.
*G06F 12/02* (2006.01)

(52) U.S. Cl.
USPC ............... 711/171; 711/170; 711/E12.001; 711/E12.002

(58) Field of Classification Search
USPC ................................ 711/171, 170
See application file for complete search history.

(56) References Cited

U.S. PATENT DOCUMENTS

| | | | |
|---|---|---|---|
| 5,566,348 A * | 10/1996 | Dahman et al. | 710/18 |
| 6,088,764 A * | 7/2000 | Shyam et al. | 711/112 |
| 6,125,394 A * | 9/2000 | Rabinovich | 709/226 |
| 6,874,061 B1 | 3/2005 | Bridge | |
| 7,089,392 B2 | 8/2006 | Branch | |
| 7,203,713 B2 | 4/2007 | Faiman et al. | |
| 7,225,209 B2 | 5/2007 | Bracey et al. | |
| 7,376,067 B2 | 5/2008 | Van Gestel et al. | |
| 7,418,544 B2 | 8/2008 | Mukherjee et al. | |
| 2004/0059758 A1* | 3/2004 | Faiman et al. | 707/205 |
| 2007/0011214 A1 | 1/2007 | Jujjuri | |
| 2007/0156957 A1 | 7/2007 | MacHardy et al. | |
| 2008/0126734 A1 | 5/2008 | Murase | |
| 2008/0270461 A1 | 10/2008 | Gordon et al. | |
| 2009/0100243 A1 | 4/2009 | Ault et al. | |
| 2010/0250748 A1* | 9/2010 | Sivasubramanian et al. | 709/226 |
| 2011/0107028 A1* | 5/2011 | Louis et al. | 711/114 |
| 2011/0107053 A1* | 5/2011 | Beckmann et al. | 711/171 |

OTHER PUBLICATIONS

"IBM Tivoli Allocation Optimizer for z/OS," (Author unknown), IBM Corporation, Software Group, 2005.
Mycroft, John, "VSE/VSAM—Inside & Out", CSI International, 2007.

* cited by examiner

*Primary Examiner* — Padmanabham Mano
*Assistant Examiner* — Kenneth Lo
(74) *Attorney, Agent, or Firm* — Nelson and Nelson; Daniel P. Nelson; Alexis V. Nelson

(57) ABSTRACT

A method for automatically optimizing an allocation amount for a data set includes receiving an extend request, specifying an allocation amount, for a data set in a storage pool. The method increments a counter in response to receiving the extend request. In the event the counter has reached a threshold value, the method automatically increases the allocation amount of the extend request, such as by multiplying the allocation amount by a multiplier. In the event the allocation amount is larger than a largest free extent in the storage pool, the method automatically decreases the allocation amount of the extend request to correspond to the largest available free extent. Such a method reduces or eliminates the chance that an extend request will fail, and reduces overhead associated with extending and consolidating extents. A corresponding apparatus and computer program product are also disclosed herein.

21 Claims, 7 Drawing Sheets

EXTENT SIZE OPTIMIZATION

BACKGROUND

1. Field of the Invention

This invention relates to apparatus and methods for storing data sets, and more particularly to apparatus and methods for optimizing the size of extents used to store data sets.

2. Background of the Invention

Currently, when a user allocates data sets on operating systems such as z/OS, the operating system requires the user to specify a primary and secondary allocation amount. The primary allocation amount is the amount of space the data set is assigned on the first extent of the volumes it resides on. The secondary allocation amount is the amount of space that subsequent extensions of the data set receive. The user may select primary and secondary allocation amounts based on how the user anticipates the data set will be used and grow over time.

If a user selects an allocation amount that is too large, meaning that the volume is too fragmented or does not have sufficient free space to accommodate the allocation, the allocation request will fail. If, on the other hand, the user selects an allocation amount that is too small, the operating system may extend the data set so many times that it hits an extent-per-volume limit. Small and numerous extents may also undesirably fragment a volume.

Some logic has been added to z/OS to enable extents to be consolidated during extend processing if the extents are adjacent to one other. However, this functionality requires additional overhead to call the extend function as well as consolidate the extents. This functionality may also undesirably reduce a user's awareness of poorly selected allocation amounts since it may hide the number of times a data set has been extended. For example, in the z/OS environment, extents associated with a data set are recorded in the catalog. The catalog, however, may not indicate how many times the data was extended. This is because certain extents may have been consolidated to form a single or fewer extents. Thus, extent consolidation functionality in z/OS or other operating systems may indirectly cause a user to specify poor allocation amounts that could otherwise be noticed and corrected by the user.

On the other hand, when a user specifies an allocation amount that is too large for the space available, the extend request will fail. Existing solutions may try to reduce the impact of failed extend requests by retrying an allocation with a reduced allocation amount. If this subsequent attempt fails, further attempts may be made by continuing to reduce the allocation amount. Unfortunately, these solutions require several passes through the extend logic code before the extend operation will succeed.

In view of the foregoing, what are needed are apparatus and methods to optimize the size of primary and secondary allocation amounts when performing extend processing. Ideally, such apparatus and methods will reduce or eliminate the chance that an extend request will fail. Such apparatus and methods will also ideally reduce overhead associated with extending and consolidating extents.

SUMMARY

The invention has been developed in response to the present state of the art and, in particular, in response to the problems and needs in the art that have not yet been fully solved by currently available apparatus and methods. Accordingly, the invention has been developed to provide apparatus and methods for optimizing allocation amounts for data sets. The features and advantages of the invention will become more fully apparent from the following description and appended claims, or may be learned by practice of the invention as set forth hereinafter.

Consistent with the foregoing, a method for automatically optimizing an allocation amount for a data set is disclosed herein. In certain embodiments, such a method includes initially receiving an extend request, specifying an allocation amount, for a data set in a storage pool. The method increments a counter in response to receiving the extend request. In the event the counter has reached a threshold value, the method automatically increases the allocation amount of the extend request, such as by multiplying the allocation amount by a multiplier. In the event the allocation amount is larger than a largest free extent in the storage pool, the method automatically decreases the allocation amount of the extend request to correspond to the largest available free extent. Such a method reduces or eliminates the chance that an extend request will fail, and reduces overhead associated with extending and consolidating extents.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
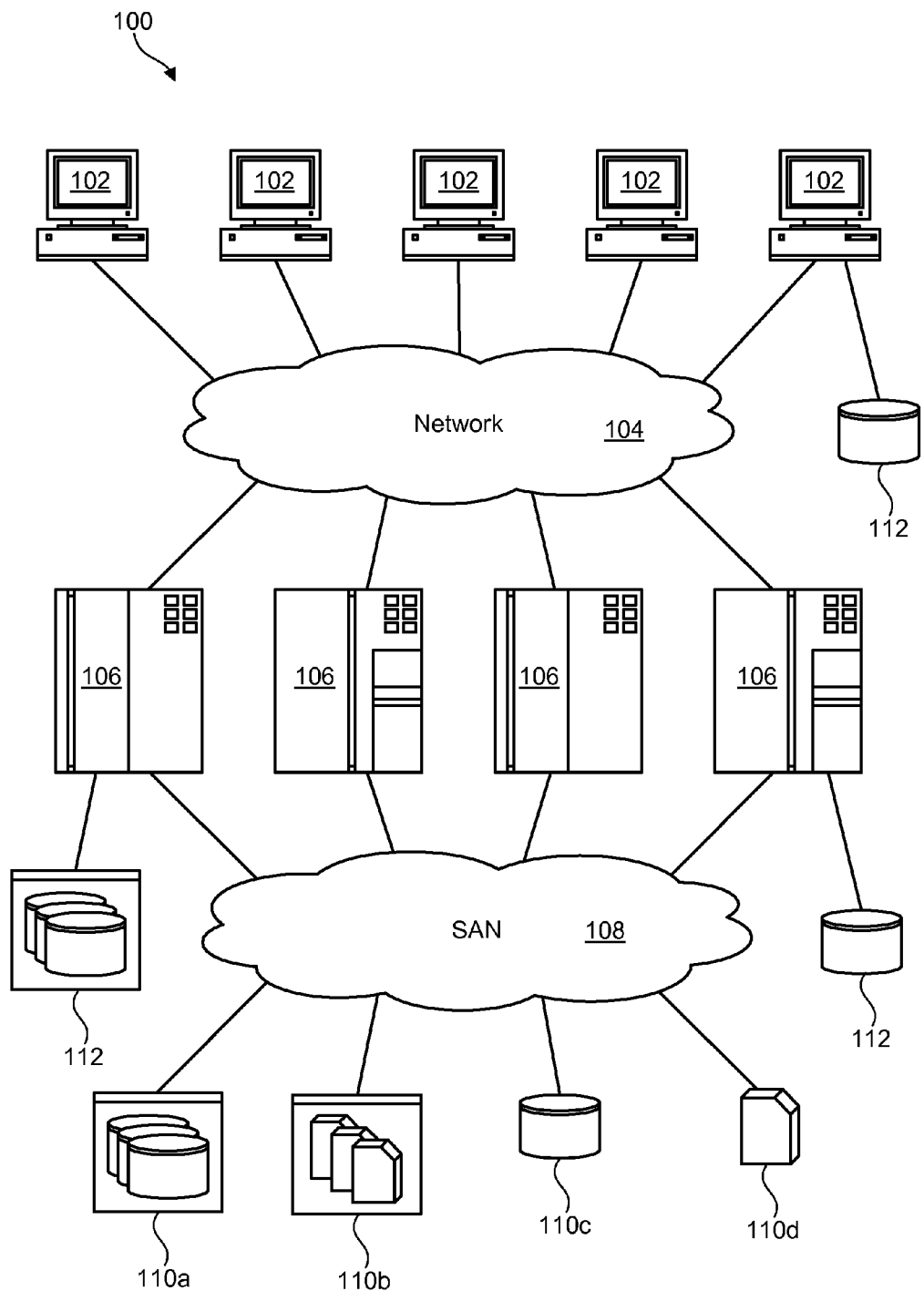
FIG. 1 is a high-level block diagram showing one example of a network environment in which an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and is not intended to be limiting. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from the extent-size optimization techniques disclosed herein.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from the extent-size optimization techniques disclosed herein.

Figure 2:
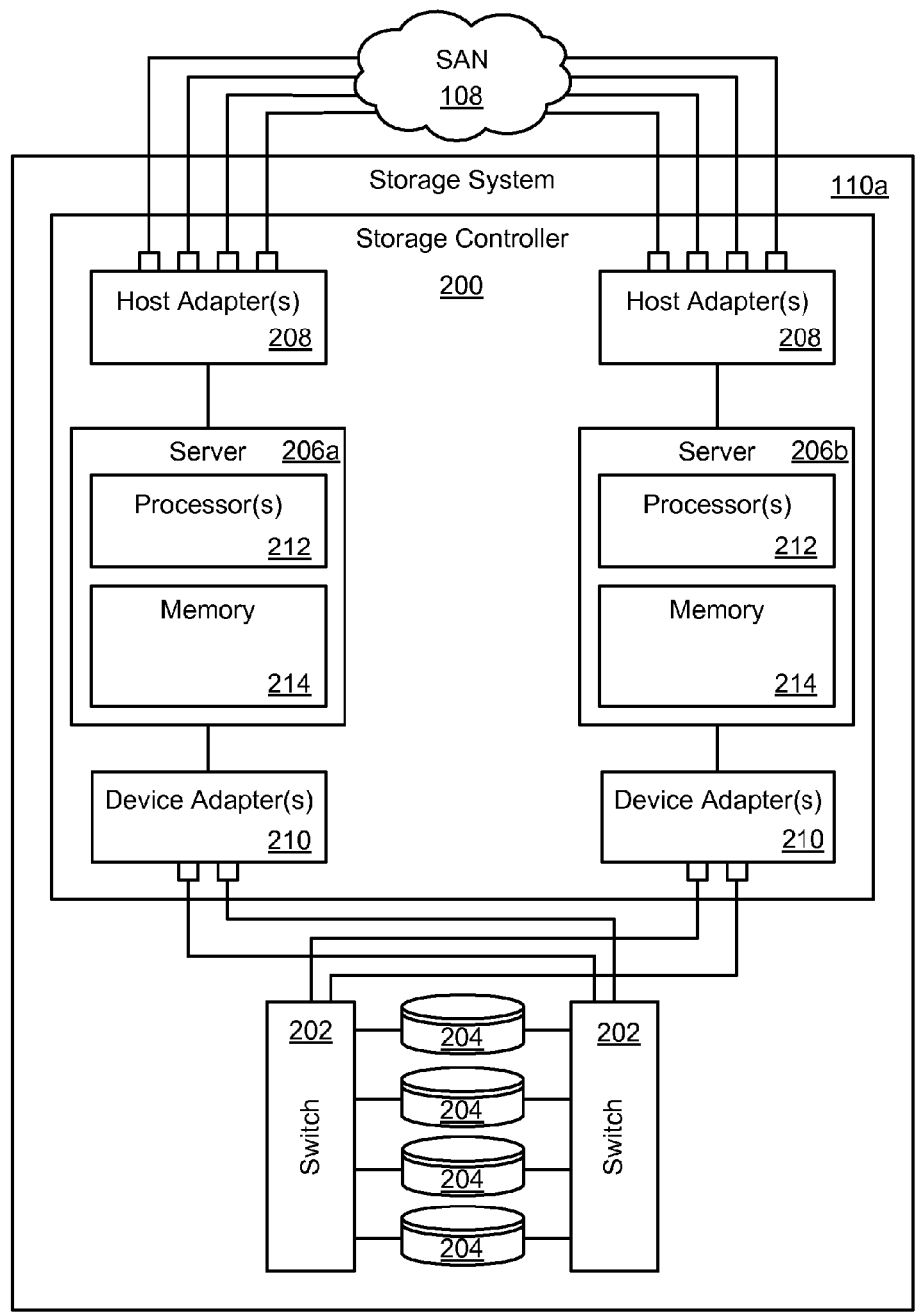
FIG. 2 is a high-level block diagram showing one example of a storage system where one or more storage pools may reside.

Referring to FIG. 2, one embodiment of a storage system 110a containing an array of storage devices 204 (e.g., hard-disk drives 204 and/or solid-state drives 204) is illustrated. The internal components of the storage system 110a are shown since the novel extent-size optimization techniques may be used to optimize allocation amounts for logical volumes residing within such a storage system 110a. Nevertheless, the extent-size optimization techniques may also be implemented within other storage systems 110, 112. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the extent-size optimization techniques disclosed herein are not limited to the IBM DS8000™ enterprise storage system 110a, but may be implemented in any comparable or analogous storage system 110 regardless of the manufacturer, product name, or components or component names associated with the storage system 110. Any storage system 110 that could benefit from the extent-size optimization techniques is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

Figure 3:
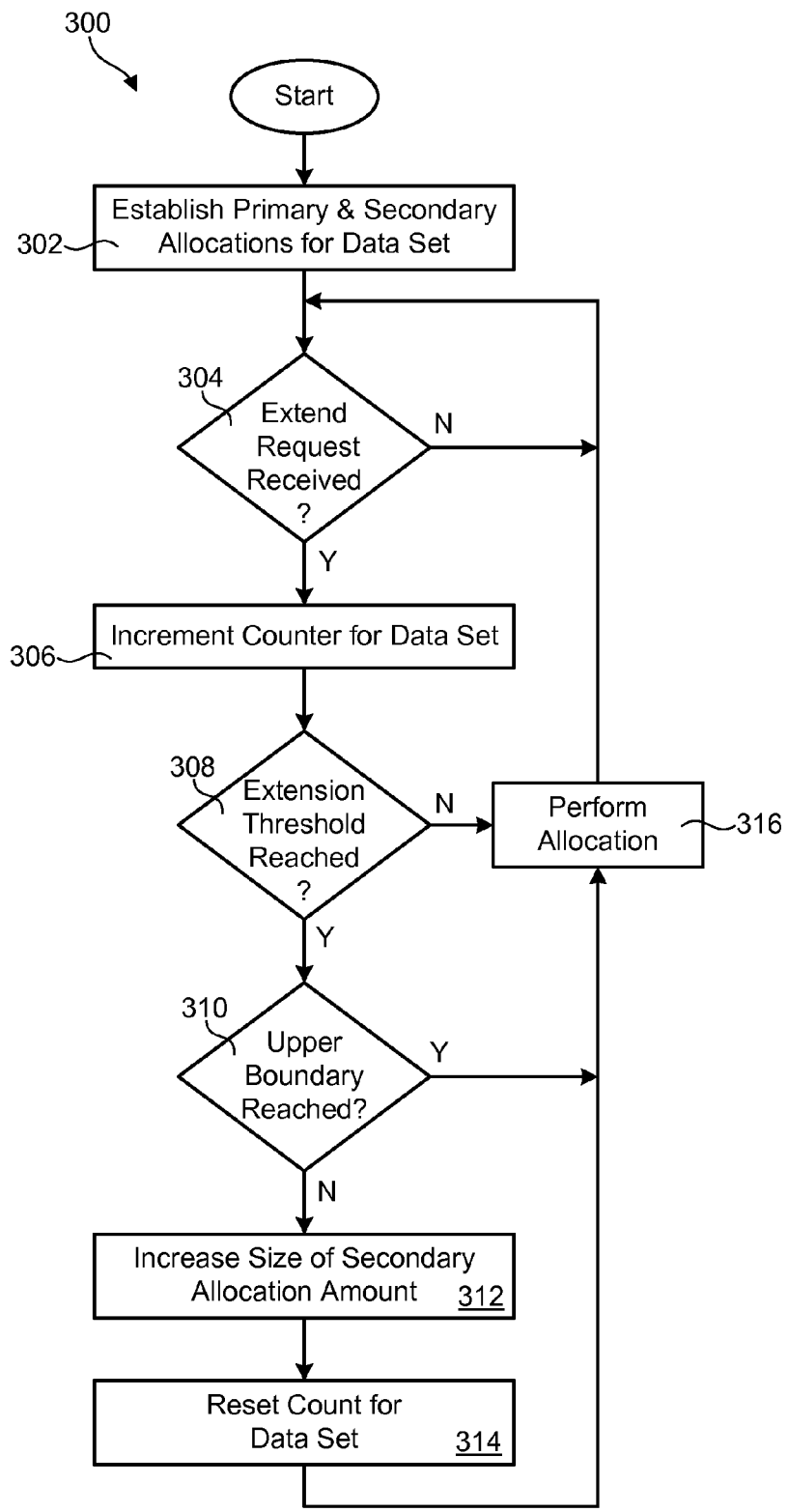
FIG. 3 is a flow diagram showing one embodiment of a method for increasing the allocation amount when the allocation amount is too small.

Referring to FIG. 3, one embodiment of a method 300 for increasing the allocation amount for a data set when the allocation amount is too small is illustrated. As previously mentioned, when a user selects an allocation amount that is too small, an operating system (such as z/OS) may extend the data set so many times that the data set will hit an extent-per-volume limit. Small and numerous extents may also undesirably fragment a volume. A method 300 in accordance with the invention may be used to adjust the allocation amount when the allocation amount is too small.

As shown, the method 300 initially establishes 302 primary and secondary allocation amounts (collectively referred to as simply "allocation amounts") for a data set. The primary and secondary allocation amounts may be selected by a user based on how the user anticipates the data set will be used and/or grow over time. The primary allocation amount specifies the amount of space the data set will be assigned on the first extent of each volume it resides on. The secondary allocation amount specifies the amount of space that subsequent extensions of the data set will be assigned.

Once the initial primary and secondary allocations amounts are established 302, the method 300 waits 304 to receive an extend request. Upon receiving an extend request, the method 300 increments 306 a counter associated with the data set. This counter may be used to monitor the number of times the data set has been extended. In selected embodiments, the count may be stored in a field of the VSAM catalog or other metadata for the data set. As the count increases, a large number of extension operations may indicate that the initial secondary allocation amount was too small and thus should be increased.

When the count reaches 308 an extension threshold value (a user-tunable value of ten extents, for example) and the allocation amount has not reached 310 an upper boundary limit, the method 300 increases 312 the size of the secondary allocation amount. In selected embodiments, the method 300 multiplies the secondary allocation amount by a multiplier (a user-tunable value of four, for example). Once the secondary allocation amount is increased 312, the method 300 resets 314 the count and performs 316 the allocation 316 in accordance with the increased secondary allocation amount. Thus, using the example provided above, if the count reaches ten, the method 300 will multiply the secondary allocation amount by four and reset 314 the count. If the count reaches ten again, the method 300 will once again multiply the secondary allocation amount by four, thereby making it sixteen times larger than its original size. In this way, the method 300 increases the secondary allocation amount to reduce the time and resources that are needed to process extend requests and consolidate extents.

As mentioned, assuming the count continues to reach the extension threshold value, the method 300 continues to increase 312 the secondary allocation amount until an upper boundary limit is reached. If the upper boundary limit is reached, the method 300 simply performs 316 the allocation without increasing the size of the secondary allocation amount. In certain embodiments, the upper boundary limit is the median largest extent size for volumes residing in the storage pool, as will be explained in more detail in FIGS. 5A and 5B. The upper boundary limit will ensure that the allocation amount does not increase to a point where an extend request will fail due to lack of space.

Figure 4:
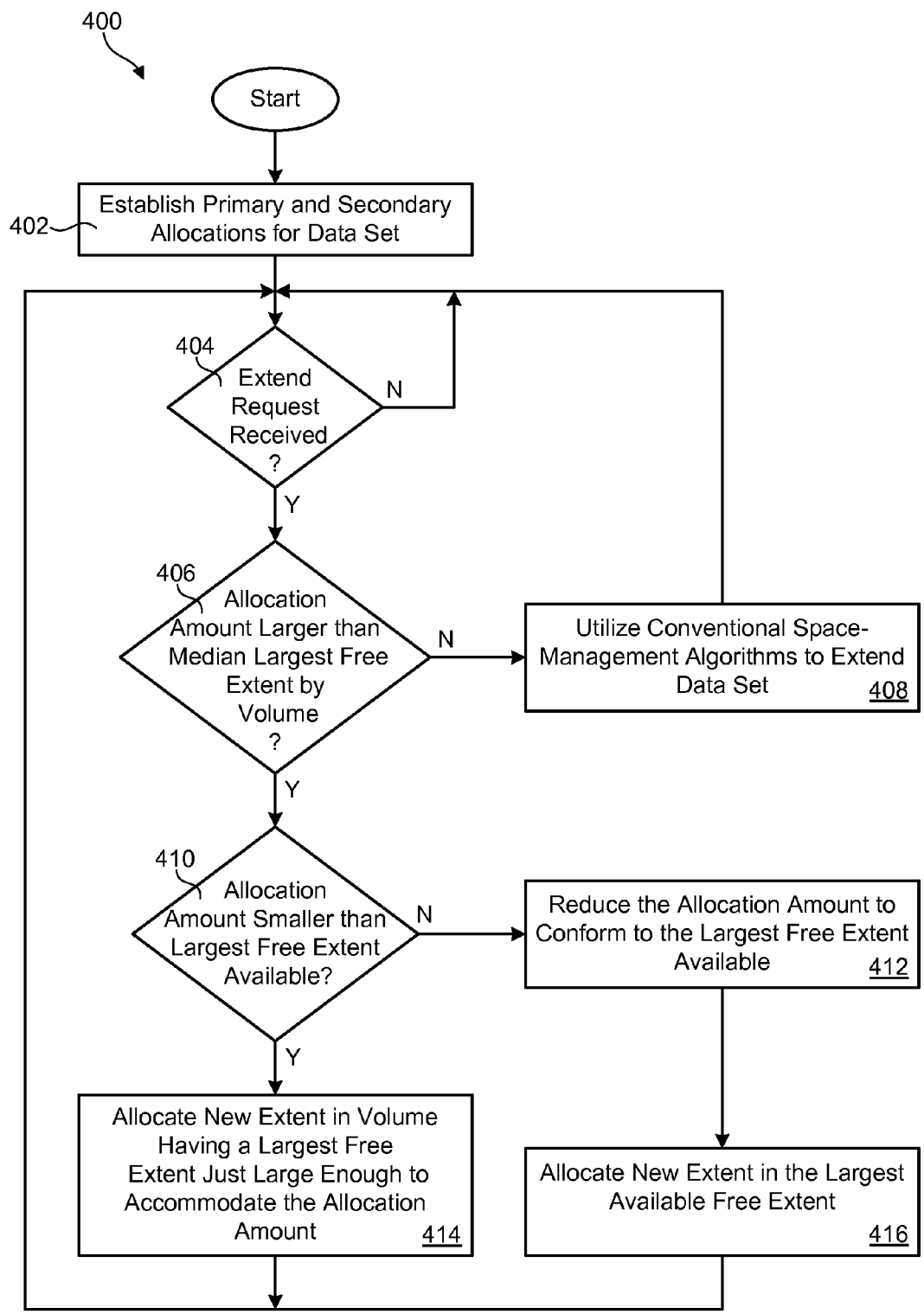
FIG. 4 is a flow diagram showing one embodiment of a method for decreasing the allocation amount when the allocation amount is too large.

Referring to FIG. 4, one embodiment of a method 400 for decreasing the allocation amount when the allocation amount is too large is illustrated. Like the method 300 illustrated in FIG. 3, the method 400 initially establishes 402 primary and secondary allocation amounts for a data set. The method 400 then waits 404 to receive an extend request for the data set. Upon receiving an extend request, the method 400 determines 406 whether the allocation amount in the extend request is larger than the median largest free extent in the storage pool. The median largest free extent is described in FIGS. 5A and 5B. If the allocation amount is smaller than the median largest free extent, the method 400 utilizes 408 conventional space-management algorithms to extend the data set. Conventional space-management algorithms may, for example, perform the extend request in storage pool volumes having the highest available total free space.

If, however, the allocation amount is larger than the median largest free extent, the method 400 determines 410 whether the allocation amount is smaller than the largest free extent available in the storage pool. The largest free extent is also explained in FIGS. 5A and 5B. If the allocation amount is larger than the largest free extent in the storage pool, the method 400 reduces 412 the allocation amount to conform to the largest free extent available. For example, if the extend request includes a requested allocation amount of 12,000 cylinders and the largest free extent available in the storage pool is only 10,000 cylinders, the method 400 will reduce 412 the allocation amount in the extend request to 10,000 cylinders. The method 400 then allocates 416 the new extent in the largest available free extent in the storage pool. This proactively prevents an allocation error before it takes place and eliminates the need to retry extend requests with reduced allocation amounts.

If, on the other hand, the allocation amount is smaller than the largest free extent available in the storage pool, the method 400 allocates 414 the new extent in the volume that has a largest free extent just large enough to accommodate the allocation amount. For example, if the extend request includes a requested allocation amount of 8,000 cylinders and there are volumes in the storage pool with largest free extents of 7,000 cylinders, 9,000 cylinders, and 12,500 cylinders, respectively, the method 400 will allocate 414 the new extent in the volume having the largest free extent of 9,000 cylinders, since this is just large enough to accommodate the allocation amount. This will ensure that space in larger extents is not wasted or used in an inefficient manner, or space in smaller extents is used in a way that fragments the data set.

Figure 5A:
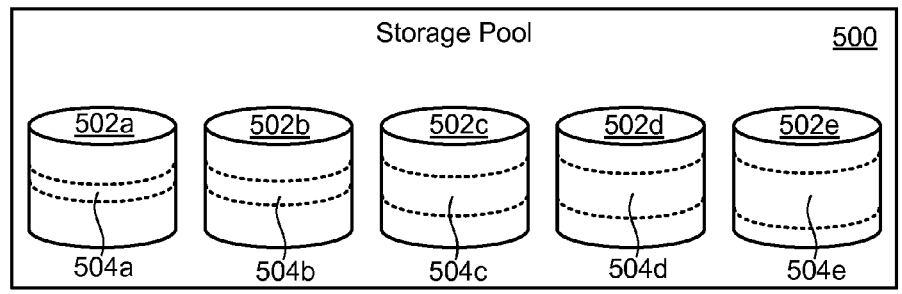
FIG. 5A is a high-level block diagram showing an example of a storage pool having an odd number of volumes.
Figure 5B:
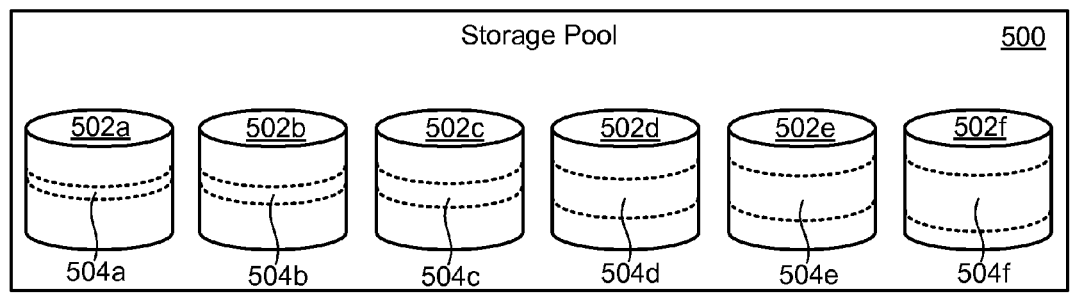
FIG. 5B is a high-level block diagram showing an example of a storage pool having an even number of volumes.

Referring to FIGS. 5A and 5B, as previously mentioned, the methods 300, 400 described in FIGS. 3 and 4 utilize the median largest free extent and the largest available free extent in a storage pool to determine whether to increase or decrease an allocation amount in an extend request. FIG. 5A shows what is meant by the median largest free extent and the largest available free extent in a storage pool 500. As shown in FIG. 5A, a storage pool 500 includes multiple logical volumes 502. Each logical volume 502 includes a largest free extent 504, which represents the largest contiguous area of free space on the volume 502 (as represented by the area between the dotted lines). The largest free extent 504 for each volume 502 in a storage pool 500 may differ in size. If the volumes 502 are organized according to the size of their largest available free extents 504, as shown in FIG. 5A, the largest free extent 504c would be the median largest free extent. Similarly, if a storage pool 500 contains an even number of volumes 502, as shown in FIG. 5B, the median largest free extent could be calculated by averaging the largest free extents 504c, 504d for the middle two volumes 502c, 502d.

Figure 6:
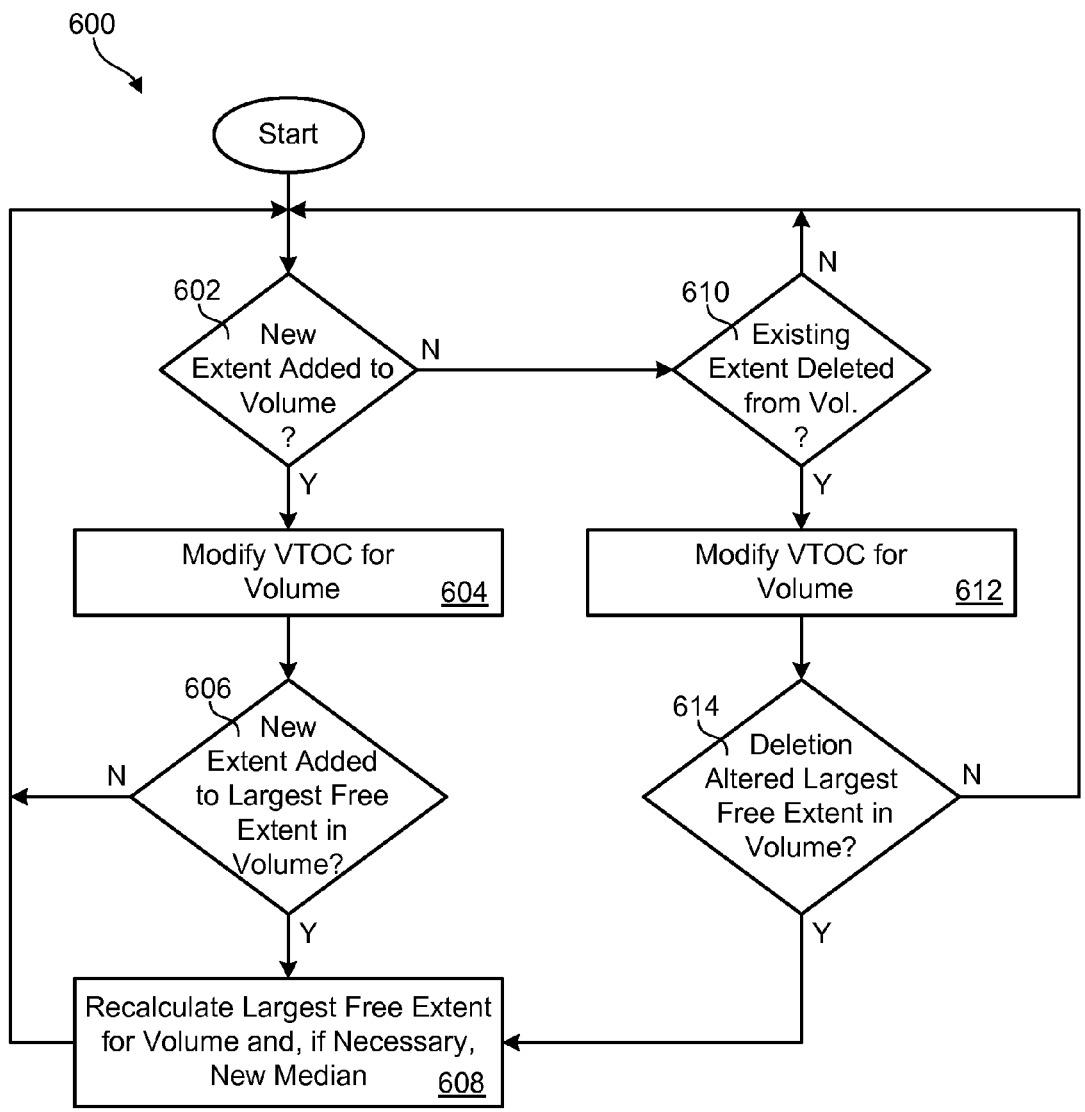
FIG. 6 is a flow chart showing one embodiment of a method for recalculating the largest free extent and the median largest free extent when an extent is added or deleted from a volume.

Referring to FIG. 6, one embodiment of a method 600 for recalculating the largest free extent 504 for a volume 502 and the median largest free extent for a storage pool 500 is illustrated. The method 600 may be used since the largest free extent 504 of a volume 502 and the median largest free extent for the storage pool 500 may change as extents are added to or deleted from the volumes 502.

As shown, the method 600 initially determines 602 whether a new extent has been added to a volume 502. If so, the method 600 modifies 604 the volume table of contents (VTOC) for the volume 502 (such as by adding an entry to the VTOC, etc.) to indicate that an extent has been added to the volume 502. The method 600 then determines 606 whether the new extent was added to the largest free extent in the volume 502. If so, the method 600 recalculates 608 the largest free extent 504 for the volume 502. If necessary, the method 600 recalculates 608 the new median largest free extent for the storage pool 500 (unless the median is not affected).

The method 600 also determines 610 whether an existing extent has been deleted from a volume 502. If so, the method 600 modifies 612 the volume table of contents (VTOC) for the volume 502 (such as by deleting an entry from the VTOC, etc.) to indicate that an extent has been deleted from the volume 502. The method 600 then determines 614 whether the deleted extent affected the largest free extent in the volume 502, such as by enlarging the existing largest free extent 504 or creating a new largest free extent 504. If so, the method 600 recalculates 608 the largest free extent 504 for the volume 502. If necessary, the method 600 recalculates 608 the median largest free extent for the storage pool 500.

Figure 7:
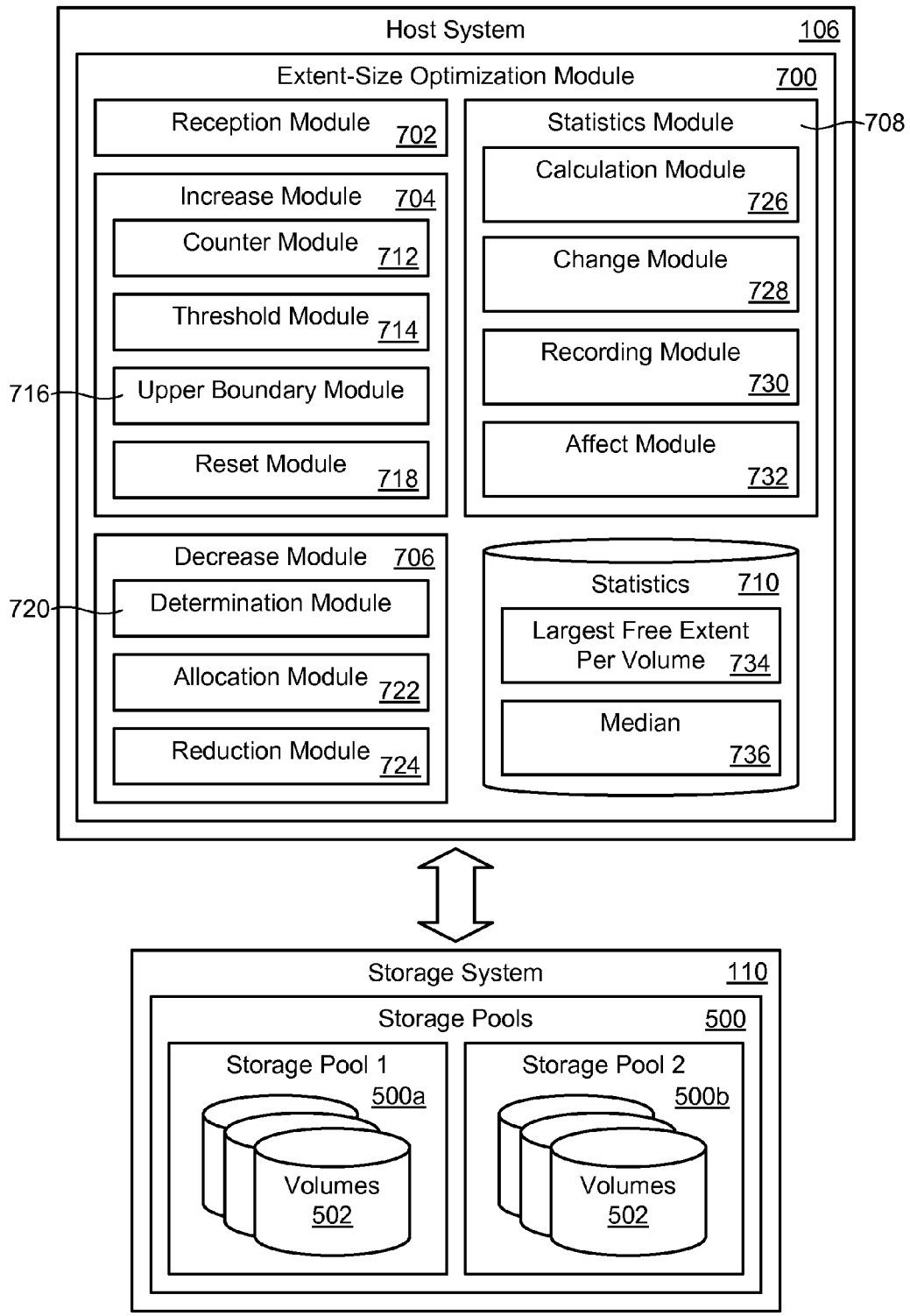
FIG. 7 is a high-level block diagram showing various modules that may be used to implement the methods illustrated in FIGS. 3, 4, and 6.

Referring to FIG. 7, the methods 300, 400, 600 described in FIGS. 3, 4, and 6 may be implemented in the form of one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that, in some embodiments, the functionality of some modules may be broken into multiple modules or, conversely, the functionality of several modules may be combined into a single module or fewer modules. It should also be recognized that the modules are not necessarily implemented in the locations where they are illustrated. For example, some functionality shown in a host system 106 may actually be implemented in a storage system 110 and vice versa. Other functionality shown only in the host system 106 may actually be distributed across the host system 106 and the storage system 110. Thus, the location of the modules is presented only by way of example and is not intended to be limiting.

As shown in FIG. 7, in selected embodiments, a host system 106 may include one or more of a reception module 702, an increase module 704, a decrease module 706, a statistics module 708, and statistics 710. In general, the reception module 702 may be configured to receive or intercept an extend request. An increase module 704 may be configured to increase the allocation amount of an extend request when the allocation amount is too small. Similarly, a decrease module 706 may be configured to decrease the allocation amount of an extend request when the allocation amount is too large. A statistics module 708 may be used to gather and maintain various statistics 710 that may be used by both the increase module 704 and the decrease module 706.

In selected embodiments, the increase module 704 may include one or more of a counter module 712, a threshold module 714, an upper boundary module 716, and a reset module 718. When the reception module 702 receives an extend request for a given data set, the counter module 712 increments 306 a count associated with the data set. Thus, the counter module 712 may be used to monitor the number of times the data set is extended. A threshold module 714 may detect when the count reaches a user-tunable extension threshold value. When the count reaches the extension threshold value, the threshold module 714 may cause the increase module 704 to increase the allocation amount associated with the extend request. For example, the increase module 704 may multiply the allocation amount by a user-tunable multiplier value. A reset module 718 may then reset the count and the counter module 712 may begin counting the number of times the data set is extended using the increased allocation amount. An upper boundary module 716 may ensure that the allocation amount is not increased above an upper boundary limit, such as above the median largest free extent size 736 for volumes residing in the storage pool 500 associated with the data set. This will ensure that the allocation amount does not increase to the point where an extend request will fail due to lack of available space.

In selected embodiments, the decrease module 706 may include one or more of a determination module 720, an allocation module 722, and a reduction module 724. When the reception module 702 receives an extend request for a given data set, the determination module 720 determines whether the allocation amount in the extend request is larger than the median largest free extent size 736 in the storage pool. If the allocation amount is smaller than the median largest free extent size 736, conventional space-management algorithms may be used to extend the data set. On the other hand, if the allocation amount is larger than the median largest free extent size 736, the determination module 720 may determine whether the allocation amount is larger than the largest available free extent 734 in the storage pool 500. If the allocation amount is larger than the largest available free extent 734 in the storage pool 500, the reduction module 724 reduces the allocation amount to conform to the largest free extent 734 in the pool 500. If, on the other hand, the allocation amount is smaller than the largest available free extent 734 in the storage pool 500, the allocation module 722 allocates the new extent in the volume 502 having a largest free extent 734 just large enough to accommodate the allocation amount.

In certain embodiments, a statistics module 708 may include one or more of a calculation module 726, a change module 728, a recording module 730, and an affect module 732. The calculation module 726 may calculate various statistics 710 for use by the increase module 704 and the decrease module 706. For example, the calculation module 726 may calculate the largest free extent 734 for each volume 502 in a storage pool 500 and a median largest free extent 736 for each storage pool 500. A change module 728 may detect changes to volumes 502 in the storage pools 500. For example, the change module 728 may detect when a new extent is added to a volume 502 or an existing extent is deleted from a volume 502. When such a change occurs, a recording module 730 may record the change in the VTOC or other metadata associated with the volume 502. For example, the recording module 730 may add or delete an entry from the VTOC when an extent is added to or deleted from a volume 502.

An affect module 732 may determine whether adding an extent to or deleting an extent from a volume 502 affects the largest free extent 734 in the volume 502 or the median largest free extent 736 for the storage pool 500. If so, the calculation module 726 will recalculate the largest free extent 734 for the volume 502 and, if necessary, the median largest free extent 736 for the storage pool 500. On the other hand, if an extent was added to or deleted from a volume 502 such that it does not affect the largest free extent 734, then no action is required. In this way, the statistics module 708 generates statistics 710 and keeps the statistics 710 up-to-date.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for automatically optimizing allocation amounts for data sets in a storage pool, the method comprising:
    receiving an extend request for a data set in a storage pool, the extend request specifying an allocation amount;
    incrementing a counter in response to receiving the extend request, the counter indicating a number of times the data set has been extended since the counter was last reset;
    in the event the counter has reached a threshold value and the allocation amount has not reached an upper boundary limit, automatically increasing the allocation amount of the extend request and resetting the counter; and
    executing the extend request in accordance with the allocation amount.

2. The method of claim 1, further comprising, in the event the allocation amount has reached the upper boundary limit, executing the extend request without increasing the allocation amount.

3. The method of claim 1, further comprising calculating a median largest free extent for volumes residing in the storage pool.

4. The method of claim 3, further comprising setting the upper boundary limit to the size of the median largest free extent.

5. The method of claim 1, wherein increasing the allocation amount comprises multiplying the allocation amount by a multiplier.

6. The method of claim 5, wherein the multiplier is user-tunable.

7. The method of claim 3, further comprising recalculating the median largest free extent for the storage pool when a largest free extent of at least one volume in the storage pool changes.

8. An apparatus for automatically optimizing allocation amounts for data sets in a storage pool, the apparatus comprising:
    a reception module to receive an extend request for a data set in a storage pool, the extend request specifying an allocation amount;
    a counter module to increment a counter in response to receiving the extend request, the counter indicating a number of times the data set has been extended since the counter was last reset;
    a threshold module to detect when the counter has reached a threshold value; and
    an increase module to, in the event the counter has reached the threshold value and the allocation amount has not reached an upper boundary limit, automatically increase the allocation amount of the extend request and reset the counter.

9. The apparatus of claim 8, further comprising an upper boundary module to, in the event the allocation amount has reached the upper boundary limit, leave the allocation amount unchanged.

10. The apparatus of claim 8, further comprising a calculation module to calculate a median largest free extent for volumes residing in the storage pool.

11. The apparatus of claim 10, wherein the upper boundary limit is set to the size of the median largest free extent.

12. The apparatus of claim 8, wherein the increase module increases the allocation amount by multiplying the allocation amount by a multiplier.

13. The apparatus of claim 12, wherein the multiplier is user-tunable.

14. The apparatus of claim 10, wherein the calculation module is further configured to recalculate the median largest free extent for the storage pool when a largest free extent of at least one volume in the storage pool changes.

15. A computer program product to automatically optimize allocation amounts for data sets in a storage pool, the computer program product comprising a non-transitory computer-readable storage medium having computer-usable program code embodied therein, the computer-usable program code comprising:
  computer-usable program code to receive an extend request for a data set in a storage pool, the extend request specifying an allocation amount;
  computer-usable program code to increment a counter in response to receiving the extend request, the counter indicating a number of times the data set has been extended since the counter was last reset;
  computer-usable program code to, in the event the counter has reached a threshold value and the allocation amount has not reached an upper boundary limit, automatically increase the allocation amount of the extend request and reset the counter; and
  computer-usable program code to execute the extend request in accordance with the allocation amount.

16. The computer program product of claim 15, further comprising computer-usable program code to, in the event the allocation amount has reached the upper boundary limit, execute the extend request without increasing the allocation amount.

17. The computer program product of claim 15, further comprising computer-usable program code to calculate a median largest free extent for volumes residing in the storage pool.

18. The computer program product of claim 17, further comprising computer-usable program code to set the upper boundary limit to the size of the median largest free extent.

19. The computer program product of claim 15, wherein increasing the allocation amount comprises multiplying the allocation amount by a multiplier.

20. The computer program product of claim 19, wherein the multiplier is user-tunable.

21. The computer program product of claim 17, further comprising computer-usable program code to recalculate the median largest free extent for the storage pool when a largest free extent of at least one volume in the storage pool changes.

* * * * *